(12) United States Patent
Ota

(10) Patent No.: US 9,148,082 B2
(45) Date of Patent: Sep. 29, 2015

(54) CONTROL DEVICE AND CONTROL METHOD

(71) Applicant: Takashi Ota, Toyota (JP)

(72) Inventor: Takashi Ota, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/266,164

(22) Filed: Apr. 30, 2014

(65) Prior Publication Data

US 2014/0346999 A1 Nov. 27, 2014

(30) Foreign Application Priority Data

May 21, 2013 (JP) ................................. 2013-107433

(51) Int. Cl.
*H02P 23/00* (2006.01)
*H02P 27/06* (2006.01)
*H02P 23/08* (2006.01)
*B60L 3/00* (2006.01)

(52) U.S. Cl.
CPC ........... *H02P 23/0095* (2013.01); *B60L 3/0061* (2013.01); *H02P 23/08* (2013.01); *H02P 27/06* (2013.01); *H02P 2207/01* (2013.01)

(58) Field of Classification Search
CPC ................ B60W 20/00; B60W 10/06; B60W 2510/081; B60W 2510/244; B60W 2520/10; B60W 2540/10; B60W 2540/12; B60W 2710/0644; B60W 2710/0666; B60W 2710/081; B60W 2710/083; H02P 27/06; H02P 2201/09
USPC ............. 318/139, 400.1, 400.3, 798, 52, 511, 318/807, 799
See application file for complete search history.

(56) References Cited

U.S. PATENT DOCUMENTS

| 5,235,503 | A | * | 8/1993 | Stemmler et al. ............... 363/37 |
| 5,371,645 | A | * | 12/1994 | Mochizuki ...................... 361/22 |
| 6,078,173 | A | * | 6/2000 | Kumar et al. ............ 324/765.01 |
| 7,923,961 | B2 | * | 4/2011 | Takamatsu et al. ........... 318/811 |
| 8,040,083 | B2 | * | 10/2011 | Okamura et al. ............. 318/139 |
| 2004/0113571 | A1 | * | 6/2004 | Kumar ............................ 318/34 |
| 2009/0021198 | A1 | * | 1/2009 | Okamura et al. .......... 318/400.3 |
| 2009/0096395 | A1 | * | 4/2009 | Nakayama ............... 318/400.15 |
| 2010/0052583 | A1 | * | 3/2010 | Takamatsu et al. ...... 318/400.09 |
| 2010/0116575 | A1 | * | 5/2010 | Nozawa et al. .......... 180/65.285 |
| 2011/0026172 | A1 | * | 2/2011 | Matsumoto ..................... 361/31 |
| 2013/0170256 | A1 | * | 7/2013 | Choi et al. ...................... 363/37 |

FOREIGN PATENT DOCUMENTS

| JP | 08-289405 | A | 11/1996 |
| JP | 2005-354785 | A | 12/2005 |
| JP | 2007-259631 | A | 10/2007 |
| JP | 2010-130890 | A | 6/2010 |
| JP | 2012-228131 | A | 11/2012 |

* cited by examiner

*Primary Examiner* — Paul Ip
(74) *Attorney, Agent, or Firm* — Sughrue Mion, PLLC

(57) ABSTRACT

A control device for an induction motor that drives a vehicle includes an electronic control unit. The electronic control unit i) controls torque of the induction motor when an inverter that controls supply of electric current to the induction motor is in a locked state, so as to release the inverter from the locked state, ii) determines whether the inverter is in the locked state, iii) controls a slip frequency of the induction motor when it determines that the inverter is in the locked state, and iv) superimposes a frequency that actual torque does not substantially respond, on the slip frequency, so that an electric frequency lies in a region outside a lock region in which the inverter is in the locked state.

3 Claims, 4 Drawing Sheets

CONTROL DEVICE AND CONTROL METHOD

INCORPORATION BY REFERENCE

The disclosure of Japanese Patent Application No. 2013-107433 filed on May 21, 2013 including the specification, drawings and abstract is incorporated herein by reference in its entirety.

BACKGROUND OF THE INVENTION

1. Field of the Invention

The invention relates to a control device and control method for a vehicular induction motor, and in particular to a control device and control method for a vehicular induction motor, which controls the induction motor that drives the vehicle so as to prevent overheating of an inverter that controls supply of electric current to the induction motor when the inverter is locked.

2. Description of Related Art

Electric vehicles or hybrid vehicles that run with power of electric motors are known. In this type of vehicle, when the motor rotates during normal running of the vehicle, alternating current flows through each of switching devices of an inverter that controls supply of current to the motor. However, when the motor is brought into a locked state, large direct current flows through only a particular switching device or devices of the inverter, and the temperature of the switching device(s) is elevated.

In Japanese Patent Application Publication No. 2010-130890 (JP 2010-130890 A), a technology of controlling a motor so as to reduce torque of the motor when the motor is brought into a locked state is disclosed. With this control, the vehicle moves backward, and the motor rotates, so that current is prevented from being concentrated in a particular phase, and the temperature of a particular switching device(s) of the inverter is less likely or unlikely to be elevated to a high level.

In Japanese Patent Application Publication No. 2012-228131 (JP 2012-228131 A), a technology of curbing increase of the temperature of a particular phase when a motor is in a locked state, by calculating an allowable lock time for which no problem occurs even in the locked state, based on a coil temperature of the motor, and passing current through phases other than the particular phase that is being heated, when the allowable lock time passes, is described.

SUMMARY OF THE INVENTION

An induction motor may be employed as a prime mover of a vehicle. In the induction motor, when the frequency of a command signal to the induction motor, namely, electric frequency, becomes equal to 0 Hz or a low frequency, the inverter is brought into a locked state. The electric frequency in the induction motor is the sum of a measurement value of the rotation frequency of a rotor, and a slip frequency. Therefore, when the rotation frequency and the slip frequency have the opposite signs, and these values partially or wholly cancel each other out, the electric frequency becomes 0 Hz or a low frequency, and the inverter is brought into the locked state.

The inverter is placed in the locked state when the vehicle is started on an uphill road, for example. Namely, when the brake pedal is released, the vehicle slightly slides down on the uphill road. At this time, the rotational direction of the rotor of the induction motor is negative, and its rotation frequency becomes negative. Then, when the accelerator pedal is depressed, a torque command is generated to the induction motor, so as to run the vehicle forward. At this time, the torque command value is positive, and therefore, the slip frequency is positive. As a result, the rotation frequency and the slip frequency have the opposite signs, and the inverter is brought into the locked state.

When the inverter is in the locked state, it may be considered to reduce torque of the motor so as to move the vehicle backward and promote rotation of the motor, so that current is prevented from being concentrated in a particular phase, as in the control described in JP 2010-130890 A, for example. However, sliding-down of the vehicle on which the induction motor is installed has already occurred in the locked state, and, if the vehicle is further moved backward under the above control, from this condition, the driver may feel strange or uncomfortable, and the drivability may deteriorate.

The invention provides a control device and control method, which controls the induction motor when an inverter that controls supply of electric current to the induction motor is in a locked state, so as to assure power performance required to release the inverter from the locked state, while curbing increase of the temperature of a particular switching device or devices of the inverter, without deteriorating the drivability.

First aspect of the invention is concerned with a control device for a vehicle including an induction motor that drives the vehicle, and an inverter that controls supply of electric current to the induction motor. The control device includes an electronic control unit. The electronic control unit is configured to i) control torque of the induction motor when the inverter is in a locked state, so as to release the inverter from the locked state, ii) determine whether the inverter is in the locked state, iii) control a slip frequency of the induction motor when the electronic control unit determines that the inverter is in the locked state, and iv) superimpose a frequency that actual torque does not substantially respond, on the slip frequency, so that an electric frequency lies in a region outside a lock region in which the inverter is in the locked state.

In the control device as described above, the electronic control unit may be configured to superimpose the frequency that the actual torque does not substantially respond, on the slip frequency, so that a central frequency of the electric frequency lies in the region outside the lock region.

Second aspect of the invention is concerned with a control method for a vehicle. The vehicle includes an induction motor that drives the vehicle, an inverter that controls supply of electric current to the induction motor, and an electronic control unit. The control method includes i) controlling torque of the induction motor by the electronic control unit when the inverter is in a locked state, to release the inverter from the locked state; ii) determining by the electronic control unit whether the inverter is in the locked state; iii) controlling a slip frequency of the induction motor by the electronic control unit when the electronic control unit determines that the inverter is in the locked state, and iv) superimposing, by the electronic control unit, a frequency that actual torque does not substantially respond, on the slip frequency, so that an electric frequency lies in a region outside a lock region in which the inverter is in the locked state.

According to the control device and control method of the invention, when the inverter that controls supply of electric current to the induction motor is in the locked state, it is possible to assure the power performance required to release the inverter from the locked state, while curbing increase of the temperature of the particular switching device(s) of the inverter, without deteriorating the drivability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicular induction motor control device according to one embodiment of the invention will be described with reference to the drawings. An electric vehicle driven by an induction motor is taken as one example, and the vehicular induction motor control device installed on the electric vehicle will be described. This invention is not limitedly applied to the induction motor control device installed on the electric vehicle, but may also be applied to a vehicular induction motor control device installed on a hybrid vehicle, namely, a vehicle that runs with power of an engine and an induction motor.

Figure 1:
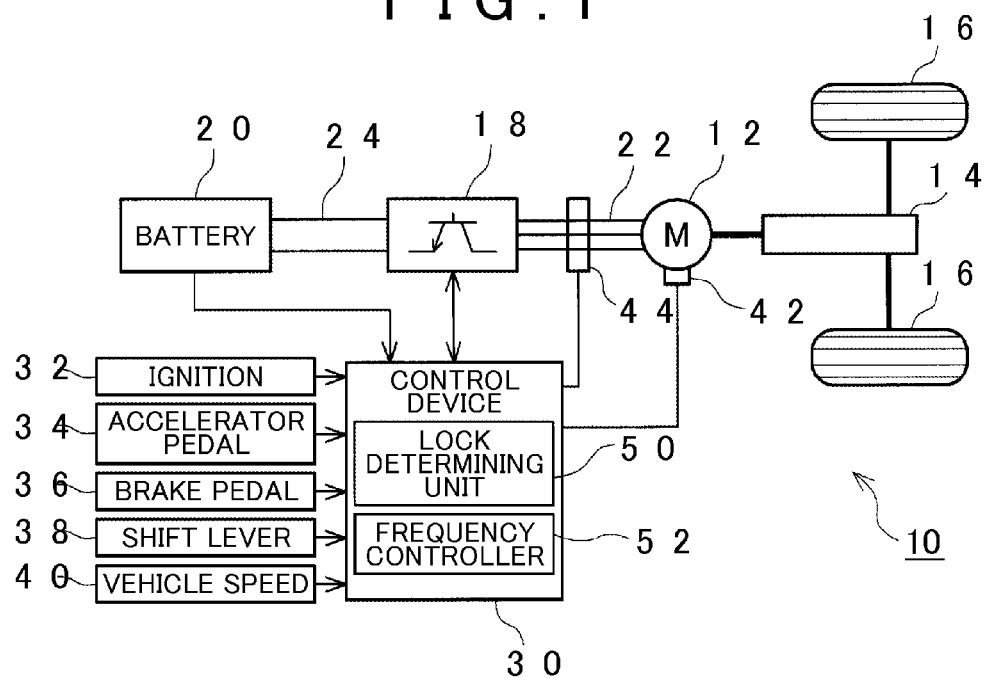
FIG. 1 is a view showing the construction of an electric vehicle according to one embodiment of the invention.

Initially, the construction of an electric vehicle 10 on which the vehicular induction motor control device according to this embodiment is installed will be described with reference to FIG. 1. FIG. 1 schematically shows the construction of the electric vehicle 10 according to this embodiment.

The electric vehicle 10 has an induction motor 12 as a prime mover. Drive wheels 16 are connected to the induction motor 12 via a power transmission mechanism 14. The power transmission mechanism 14 includes a speed reducing mechanism that reduces the rotational speed of an output shaft of the induction motor 12, and a differential mechanism that absorbs a difference in the rotational speed between the right and left drive wheels 16. The power of the induction motor 12 is transmitted to the drive wheels 16 via the power transmission mechanism 14, so as to run the electric vehicle 10.

The induction motor 12 is electrically connected to a battery 20 via an inverter 18. The induction motor 12 and the inverter 18 are connected via a cable 22 for three-phase AC transmission. On the other hand, the inverter 18 and the battery 20 are connected via a DC cable 24.

The battery 20 is a secondary battery capable of charge and discharge. For example, the battery 20 is a nickel-metal-hydride battery or a lithium-ion battery. Needless to say, a power storage device, such as a capacitor, capable of charge and discharge, other than the secondary battery, may be used in place of the battery 20.

Electric power stored in the battery 20 is converted by the inverter 18 from DC power into AC power, and then supplied to the induction motor 12, so as to drive the induction motor 12. Also, electric power generated by the induction motor 12 when operating in a regenerative mode is converted by the inverter 18 from AC power into DC power, and then fed to and stored in the battery 20. Thus, the induction motor 12 is able to function as a motor and a generator.

Figure 2:
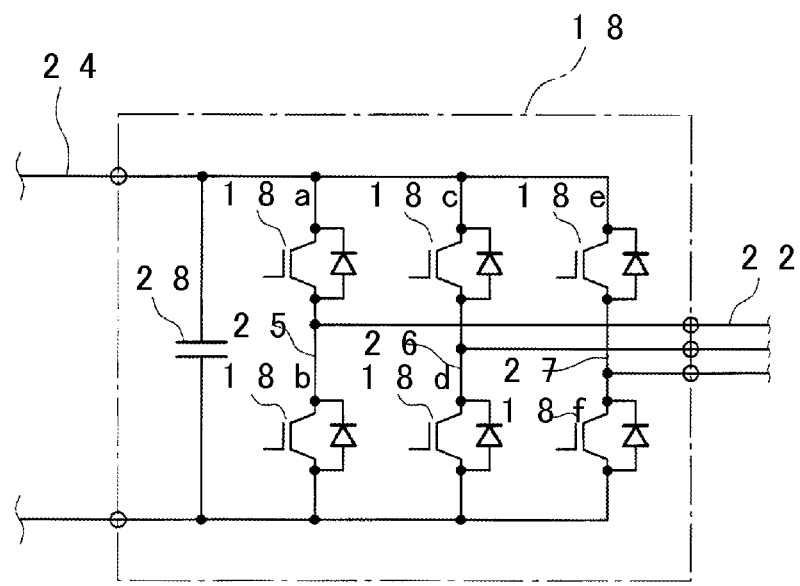
FIG. 2 is an electric circuit diagram of an inverter.

The construction of the inverter 18 will be described in detail with reference to FIG. 2. FIG. 2 is an electric circuit diagram of the inverter 18.

In a circuit within the inverter 18, U-phase arm 25, V-phase arm 26, and W-phase arm 27 are provided in parallel, between a positive bus and a negative bus connected to the battery 20. A switching device 18a and a switching device 18b are connected in series to the U-phase arm 25, and a switching device 18c and a switching device 18d are connected in series to the V-phase arm 26, while a switching device 18e and a switching device 18f are connected in series to the W-phase arm 27. The switching devices 18a-18f may be selected from, for example, IGBTs (Insulated Gate Bipolar Transistors), power transistors, and thyristors.

A middle point of each of the U-phase, V-phase and W-phase arms 25, 26, 27 is connected to each phase end of each phase coil of the induction motor 12. Namely, a middle point of the U-phase arm 25 is connected to one end of a U-phase coil of the induction motor 12, and a middle point of the V-phase arm 26 is connected to one end of a V-phase coil of the induction motor 12, while a middle point of the W-phase arm 27 is connected to one end of a W-phase coil of the induction motor 12. The induction motor 12 is constructed such that the other ends of respective phase coils of the induction motor 12 are connected to a common neutral point of the motor.

Also, in the circuit within the inverter 18, a capacitor 28 is provided in parallel with the respective phase arms 25, 26, 27, between the positive bus and negative bus connected to the battery 20. The capacitor 28 smooths the DC voltage applied from the battery 20 to the inverter 18.

The operation of the inverter 18 will be described. DC power is supplied from the battery 20 to the respective phase arms 25, 26, 27. When the DC power is supplied to the respective phase arms 25, 26, 27, the switching devices 18a-18f are turned ON/OFF according to PWM (pulse-width modulation) control signals from a vehicular induction motor control device 30 which will be described later. In this manner, the inverter 18 converts the DC power into three-phase AC power, and drives the induction motor 12 using the AC power.

Referring back to FIG. 1, the electric vehicle 10 has the vehicular induction motor control device (which will be simply referred to as "control device") that controls the induction motor 12 based on a request of the driver and vehicle conditions. The control device 30 comprises a microcomputer.

An ignition switch 32, an accelerator pedal position sensor 34 that detects the amount of depression of the accelerator pedal, a brake pedal position sensor 36 that detects the amount of depression of the brake pedal, a shift position sensor 38 that detects the operation position of the shift lever, and a vehicle sensor 40 that detects the vehicle speed are connected to the control device 30. The control device 30 grasps the request of the driver and the vehicle conditions, based on input signals from these sensors.

Also, a voltage sensor that detects the voltage between the terminals of the battery 20, a current sensor that detects charge/discharge current of the battery 20, and a temperature sensor that detects the temperature of the battery 20 (all of these sensors are not shown) are connected to the control device 30. The control device 30 manages conditions of the battery 20 based on input signals from these sensors.

Also, a rotational position detection sensor 42 that detects the rotational position of a rotor of the induction motor 12, and a current sensor 44 that detects current applied to the induction motor 12 are connected to the control device 30. The control device 30 outputs switching control signals to the inverter 18, based on the input signals from these sensors, and the above-described driver's request and battery conditions.

Figure 3:
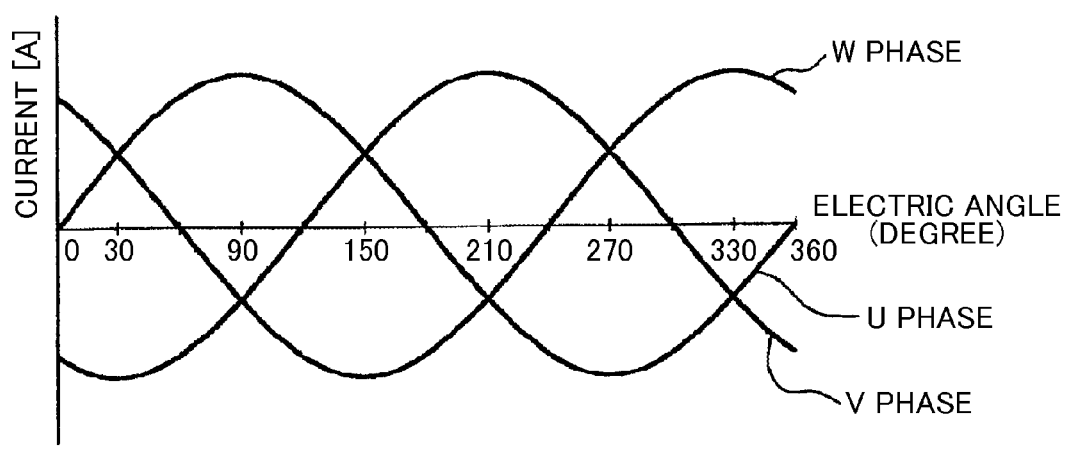
FIG. 3 is a view showing waveforms of three-phase alternating currents supplied to an induction motor.

When the inverter 18 is brought into a locked state, current is concentrated in a particular phase, and the temperature of particular switching devices of the inverter 18 is elevated to a high level. The reason of this phenomenon will be described with reference to FIG. 3. FIG. 3 shows waveforms of three-phase alternating currents supplied to the induction motor 12. The waveforms are sine waves, and there is a phase difference of 120° between any two phases of the U phase, V phase, and W phase. The electric angle of the waveforms of the three-phase alternating currents is determined according to the rotation angle of the rotor of the induction motor 12.

The locked state of the inverter 18 appears when the frequency of a command signal to the induction motor 12, namely, the electric frequency, becomes 0 Hz or a low frequency. As described above in "Description of Related Art", the electric frequency in the induction motor 12 is the sum of a measurement value of the rotation frequency of the rotor, and the slip frequency. Therefore, when the rotation frequency and the slip frequency have the opposite signs, and these values partially or wholly cancel each other out, the electric frequency becomes 0 Hz or a low frequency. This condition results in the locked state of the inverter 18. Hereinafter, the locked state of the inverter 18 will be simply called "inverter lock". A region in which the electric frequency is 0 Hz or a low frequency, namely, in a region in which the electric frequency f satisfies a condition that −A≤f≤A (A is a low frequency), will be denoted as "lock region".

When the "inverter lock" occurs, the waveforms of the three-phase alternating currents are stopped at the electric angle corresponding to the fixed rotation angle, and the currents at the electric angle flow continuously. Namely, a direct current flows through each phase. The direct currents flow through the switching devices 18*a*-18*f* of the inverter 18. Depending on the fixed electric angle, current is concentrated in a particular phase. As a result, large current flows through the switching devices corresponding to this particular phase; therefore, the devices are more likely to generate heat due to heat loss thereof, and undergo thermal breakdown.

Thus, in this embodiment, the control device 30 is configured as described below, so that the temperature of particular inverter devices of the inverter 18 is less likely or unlikely to increase, even in the event of "inverter lock".

The control device 30 has a lock determining unit 50 that determines whether the "inverter lock" occurs (i.e., whether the inverter 18 is in the locked state), and a frequency controller 52 that controls the slip frequency of the induction motor 12 when it is determined that the "inverter lock" occurs. Then, the frequency controller 52 superimposes high-frequency wave whose frequency is equal to or higher than the actual torque response frequency, on the slip frequency, so that the electric frequency can get out of the lock region.

The high frequency that is equal to or higher than the actual torque response frequency is a frequency to which the actual torque cannot respond. The actual torque response frequency varies depending on the control system and the hardware of the induction motor 12, but may be, for example, several hundreds of hertz (Hz). Thus, the high-frequency wave to be superimposed on the slip frequency needs to have a frequency equal to or higher than the actual torque response frequency. When the inverter 18 is in the locked state, the rotation frequency and the slip frequency have the opposite signs, and these values partially or wholly cancel each other out, so that the electric frequency falls within the lock region. In this condition, if the slip frequency is varied through the use of the high-frequency wave, the electric frequency varies according to the slip frequency while the rotation frequency of the motor remains unchanged. Thus, since the actual torque does not vary even if the frequency of the high-frequency wave as described above is superimposed on the slip frequency, the driver will Snot feel strange or uncomfortable, and the drivability can be prevented from deteriorating.

The high-frequency wave superimposed on the slip frequency is varied so that the electric frequency can get out of the lock region. More specifically, the amplitude of the high-frequency wave is largely varied, so that the electric frequency can get out of the lock region. For example, where the slip frequency of the induction motor 12 according to a torque command is 10 Hz, a command value for the slip frequency is varied within the range of 5 to 15 Hz. Here, the frequency that varies the slip frequency is a high frequency that is equal to or higher than the actual torque response frequency as described above. If the slip frequency is varied in this condition, the electric frequency varies according to the slip frequency, while the rotation frequency of the motor remains unchanged, as described above. Then, a part of the electric frequency gets out of the lock region, so that the current phase can be changed. With the current phase thus changed, the current that has been concentrated in a particular phase can be dispersed to the other phases. Accordingly, otherwise possible increase of the temperature of the switching devices corresponding to the particular phase can be curbed. Since the increase of the temperature of the switching devices can be curbed through control of the slip frequency, power performance required for the inverter 18 to get out of the locked state can be assured. It is also possible to vary the amplitude of the high-frequency wave superimposed on the slip frequency, so that a central value of the varying electric frequency gets out of the lock region. If the central value of the electric frequency lies in a region outside the lock region, the locked state of the inverter 18 can be resolved or eliminated.

The lock determining unit 50 determines that the "inverter lock" occurs (i.e., the inverter 18 is in the locked state), when the electric frequency is within the lock region, and the phase current that flows through particular switching devices is equal to or larger than a pre-set lock current value. The lock current value is a current value that makes it more likely to increase the temperature of the devices.

Figure 4A:
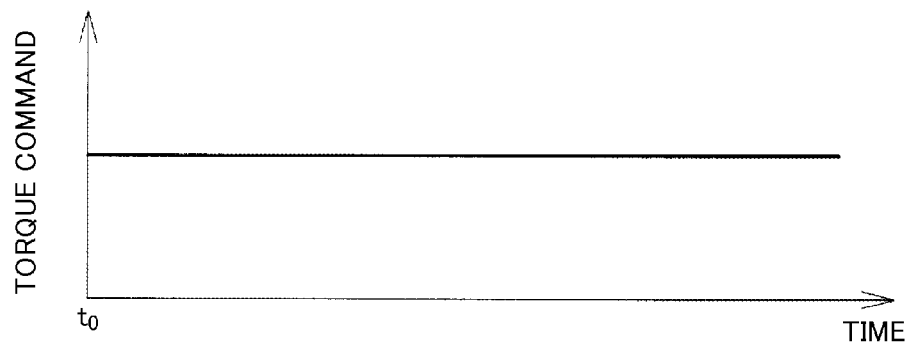
FIGS. 4A-4C are timing charts useful for explaining control operation performed on the induction motor when the inverter is in a locked state.
Figure 4B:
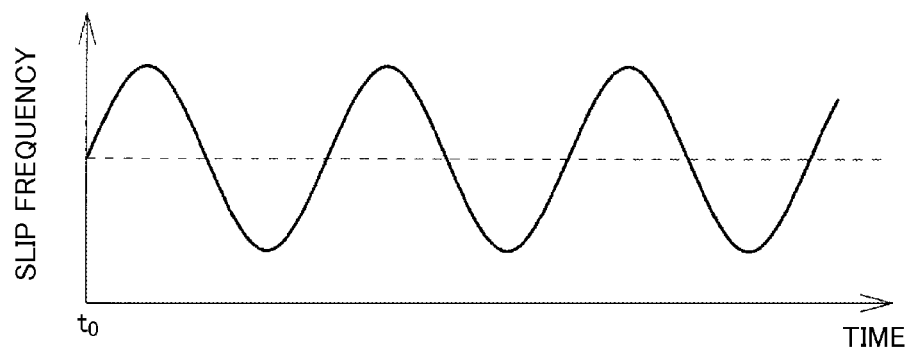
Figure 4C:
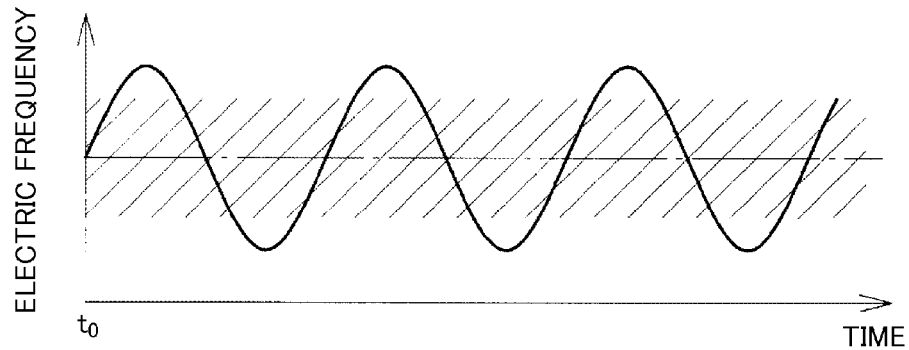

Next, the control operation performed on the induction motor 12 when the inverter 18 is brought into the locked state will be specifically described with reference to FIGS. 4A-4C. FIGS. 4A-4C are timing charts useful for explaining the control operation performed on the induction motor 12 when the inverter 18 is brought into the locked state. FIG. 4A shows a graph indicating the relationship between the torque command and time, and FIG. 4B shows a graph indicating the relationship between the slip frequency and time, while FIG. 4C shows a graph indicating the relationship between the electric frequency and time. In FIGS. 4A-4C, time t0 represents a point in time at which the "inverter lock" occurs.

When the inverter 18 is in the locked state, the torque command generated to the induction motor 12 is held constant, as indicated in the graph of FIG. 4A. At time t0, the slip frequency is controlled so as to be varied. More specifically, as shown in the graph of FIG. 4B, the high-frequency wave whose frequency is equal to or higher than the actual torque response frequency is superimposed on the slip frequency. The amplitude of the high-frequency wave superimposed on the slip frequency is controlled to such an extent that the electric frequency can get out of the lock region.

If the slip frequency is varied, the electric frequency also varies in the same manner as the slip frequency, as shown in FIG. 4C, and a part of the electric frequency goes out of the lock region (hatched region in FIG. 4C). At this time, the locked state of the inverter 18 is temporarily avoided, and current concentrated in the particular phase can be dispersed to the other phases. As a result, otherwise possible increase of the temperature of the switching devices is curbed, and it is therefore possible to assure power performance required for the inverter 18 to get out of the locked state while keeping the torque command constant, namely, without varying torque.

In this embodiment, the slip frequency is varied so that a part of the electric frequency goes out of the lock region. However, the invention is not limited to this arrangement. The slip frequency may be varied so that the central value of the electric frequency (as indicated by a one-dot chain line shown in FIG. 4C) falls within a region outside the lock region. With the central value of the electric frequency thus being outside the lock region, the inverter 18 can get out of the locked state.

Figure 5:
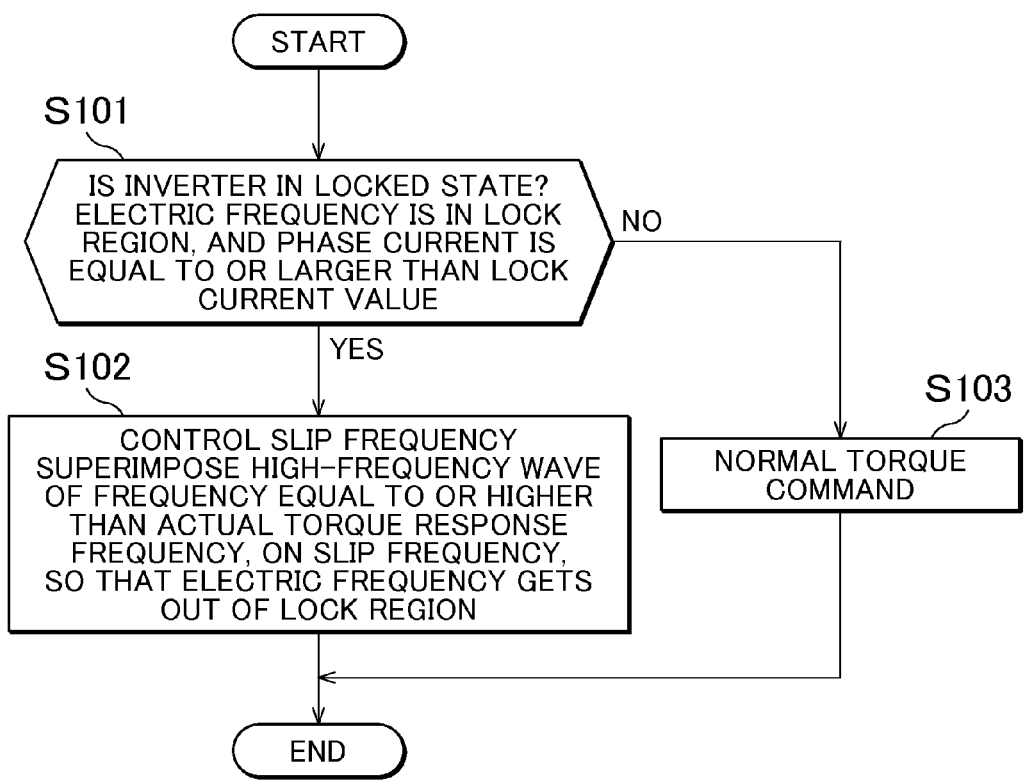
FIG. 5 is a flowchart illustrating one example of control operation performed on the induction motor when the inverter is in the locked state.

Next, the control operation of the control device 30 according to this embodiment will be described with reference to FIG. 5. FIG. 5 is a flowchart illustrating one example of control operation performed on the induction motor 12 when the inverter 18 is in the locked state.

In step S101, it is determined whether the inverter 18 is in the locked state. It is determined that the inverter 18 is in the locked state when the electric frequency is in the lock region, and any of the phase currents is equal to or larger than the lock current value. If it is determined that the inverter 18 is in the locked state, the control goes to step S102. If, on the other hand, it is determined that the inverter 18 is not in the locked state, the control goes to step S 103, and a normal torque command is generated.

In step S102, the slip frequency is controlled. More specifically, the high-frequency wave of a frequency equal to or higher than the actual torque response frequency is superimposed on the slip frequency, so that the electric frequency can get out of the lock region.

According to this embodiment, the control device 30 controls the slip frequency, thereby to vary the electric frequency, and vary the current concentrated in a particular phase; therefore, otherwise possible increase of the temperature of the switching devices corresponding to this phase can be curbed. Thus, even when the inverter 18 is in the locked state, the temperature of the switching devices is less likely or unlikely to be increased, due to control of the slip frequency, so that power performance required to release the inverter 18 from the locked state can be assured. Also, the slip frequency is varied by superimposing the high-frequency wave of a frequency equal to or higher than the actual torque response frequency, on the slip frequency. With the control for varying the slip frequency by superimposing the high-frequency wave thereon, it is possible to release the inverter 18 from the locked state, without causing torque variation in the vehicle, in other words, while preventing deterioration of the drivability.

What is claimed is:

1. A control device for a vehicle including an induction motor that drives the vehicle, and an inverter that controls supply of electric current to the induction motor, the control device comprising:
an electronic control unit configured to:
  i) control torque of the induction motor when the inverter is in a locked state, to release the inverter from the locked state,
  ii) determine whether the inverter is in the locked state,
  iii) control a slip frequency of the induction motor when the electronic control unit determines that the inverter is in the locked state, and
  iv) superimpose a frequency that actual torque does not substantially respond, on the slip frequency, so that an electric frequency lies in a region outside a lock region in which the inverter is in the locked state.

2. The control device according to claim 1, wherein
the electronic control unit is configured to superimpose the frequency that the actual torque does not substantially respond, on the slip frequency, so that a central frequency of the electric frequency lies in the region outside the lock region.

3. A control method for a vehicle including an induction motor that drives the vehicle, an inverter that controls supply of electric current to the induction motor, and an electronic control unit, the control method comprising:
  i) controlling torque of the induction motor by the electronic control unit when the inverter is in a locked state, to release the inverter from the locked state;
  ii) determining by the electronic control unit whether the inverter is in the locked state;
  iii) controlling a slip frequency of the induction motor by the electronic control unit when the electronic control unit determines that the inverter is in the locked state, and
  iv) superimposing, by the electronic control unit, a frequency that actual torque does not substantially respond, on the slip frequency, so that an electric frequency lies in a region outside a lock region in which the inverter is in the locked state.

* * * * *